United States Patent
Uehara

(10) Patent No.: US 6,788,246 B2
(45) Date of Patent: Sep. 7, 2004

(54) IN-VEHICLE PULSE RADAR DEVICE

(75) Inventor: Naohisa Uehara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 4 days.

(21) Appl. No.: 10/431,504

(22) Filed: May 8, 2003

(65) Prior Publication Data

US 2004/0066322 A1 Apr. 8, 2004

(30) Foreign Application Priority Data

Oct. 2, 2002 (JP) .......................... 2002-289703

(51) Int. Cl.$^7$ .................. G01S 13/00; G01S 13/58; B60Q 1/00; B60T 7/16
(52) U.S. Cl. .................. 342/70; 342/110; 340/436; 180/169; 701/301
(58) Field of Search .................. 342/70, 71, 94, 342/110; 340/992, 435, 436; 180/167–169; 701/96, 223, 301

(56) References Cited

U.S. PATENT DOCUMENTS 4,150,375 A * 4/1979 Ross et al. .................. 342/21
6,275,180 B1 * 8/2001 Dean et al. .................. 342/70
6,384,768 B1 * 5/2002 Kai .............................. 342/70

FOREIGN PATENT DOCUMENTS

JP 2000-321349 A 11/2000

* cited by examiner

Primary Examiner—Bernarr E. Gregory
Assistant Examiner—Brian K Andrea
(74) Attorney, Agent, or Firm—Sughrue Mion, PLLC

(57) ABSTRACT

An in-vehicle pulse radar device includes: an oscillator that generates an electromagnetic wave; a transmission amplifier that transmits the electromagnetic wave generated by the oscillator toward a target substance; an antenna that receives the reception electromagnetic wave reflected by the target substance to output data; reception amplifiers; a reception antenna; an A/D converter; and a signal processing device that pre-sums data which is sampled on the basis of the data from the A/D converter for each of distance gates, subjects the pre-summed data which is a result of the pre-summing process to an FFT process, and obtains a distance between a subject vehicle and the target substance and a relative speed therebetween in accordance with the spectrum frequency and the amplitude information which are a result of the FFT process.

4 Claims, 8 Drawing Sheets

FIG. 5

| DISTANCE GATE | n | n | n | n | ... | n | n | n | n | ... | n | n | ... | n | ... | n |
|---|---|---|---|---|---|---|---|---|---|---|---|---|---|---|---|---|
| RECEPTION PULSE NO. | 1 | 2 | 3 | 4 | ... | 8 | 9 | 10 | ... | 16 | 17 | ... | 24 | ... | 4088 | ... | 4096 |
| PRE-SUMMING | Σ | | | | | Σ | | | | Σ | | | | ... | Σ | | |
| PRE-SUMMING DATA NO. | 1 | | | | | 2 | | | | 3 | | | | ... | 512 | | |

FIG. 6

| DISTANCE GATE | n | n+1 | n | n+1 | ... | n | n+1 | n | n+1 | ... | n | n+1 |
|---|---|---|---|---|---|---|---|---|---|---|---|---|
| RECEPTION PULSE NO. | 1 | 1 | 2 | 2 | ... | 8 | 9 | 9 | 16 | 17 | ... | 24 | ... | 4088 | ... | 4096 |
| PRE-SUMMING | { Σ } | | { Σ } | | { Σ } | | { Σ } | | ... | { Σ } | |
| PRE-SUMMING DATA NO. | 1 | | 2 | | 3 | | ... | 512 | n=1~30

FIG. 8

| DISTANCE GATE | n | n+1 | n | n+1 | ... | n+1 | n | n+1 | n | n+1 | ... | n | n+1 |
|---|---|---|---|---|---|---|---|---|---|---|---|---|---|
| RECEPTION PULSE NO. | 1 | 1 | 2 | 2 | ... | 8 | 9 | 9 | 17 | ... | ... | 4088 | 4096 |
| PRE-SUMMING | $\Sigma$ | | | | | | $\Sigma$ | | $\Sigma$ | | | $\Sigma$ | |
| PRE-SUMMING DATA NO. | 1 | | | | | | 2 | | 3 | | ... | 512 | | n=1, 3, 5, 7 ··· 29

IN-VEHICLE PULSE RADAR DEVICE

BACKGROUND OF THE INVENTION

1. Field of the Invention

The present invention relates to an in-vehicle pulse radar device for measuring a distance between two vehicles.

2. Description of the Related Art

In a conventional radar device, a radar reflection wave from a sailing wave that is generated on the sea when an object such as a small ship sails is detected together with a radar reflection wave from the object, a detection of the object is executed on the basis of those two radar reflection wave components. FFT means 8 subjects a digital signal stored in a corner turn memory 7 to FFT (fast Fourier transform), and estimates a Doppler frequency of the object. As a result, the radar reflection wave from the object such as the ship is separated from the radar reflection wave from the sea wave according to a difference in the Doppler frequency. This technique is disclosed in, for example, Japanese Patent Laid-Open No. 2000-321349 (pages 3 to 4, FIG. 1).

The conventional radar device leads to such a problem that it is high in the costs and a calculation period of time is long because enormous amounts of data is subjected to the FFT process, which is unsuitable for the in-vehicle device.

SUMMARY OF THE INVENTION

The present invention has been made to solve the above-mentioned problem, and therefore an object of the present invention is to provide an in-vehicle pulse radar device that reduces a signal processing load and is high in performance and inexpensive.

An in-vehicle pulse radar device according to the present invention includes: oscillation means for generating an electromagnetic wave; transmitting means for transmitting the electromagnetic wave generated by the oscillation means toward a target substance; and receiving means for receiving the reception electromagnetic wave reflected by the target substance to output data. Also, the in-vehicle pulse radar device includes signal processing means for pre-summing the data which is sampled for each of distance gates based on the data from the receiving means, and subjecting pre-summed data which is a result of the pre-summing process to an FFT process to obtain a distance between a subject vehicle and the target substance and a relative speed therebetween in accordance with a spectrum frequency and amplitude information which are a result of the FFT process.

Accordingly, since the pre-summing process is implemented prior to the FFT process, such an effect can be attained as to realize an in-vehicle radar, which can reduce the amount of FFT calculation without any deterioration of the radar detection performance, and is high in performance and inexpensive.

BRIEF DESCRIPTION OF THE DRAWINGS

These and other objects and advantages of the present invention will become more fully apparent from the following detailed description taken with the accompanying drawings in which:

FIG. 5 shows a pre-summing process of the in-vehicle pulse radar device in accordance with the first embodiment of the present invention;

FIG. 6 shows a pre-summing process of an in-vehicle pulse radar device in accordance with a second embodiment of the present invention;

FIG. 8 shows a pre-summing process of an in-vehicle pulse radar device in accordance with a third embodiment of the present invention.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
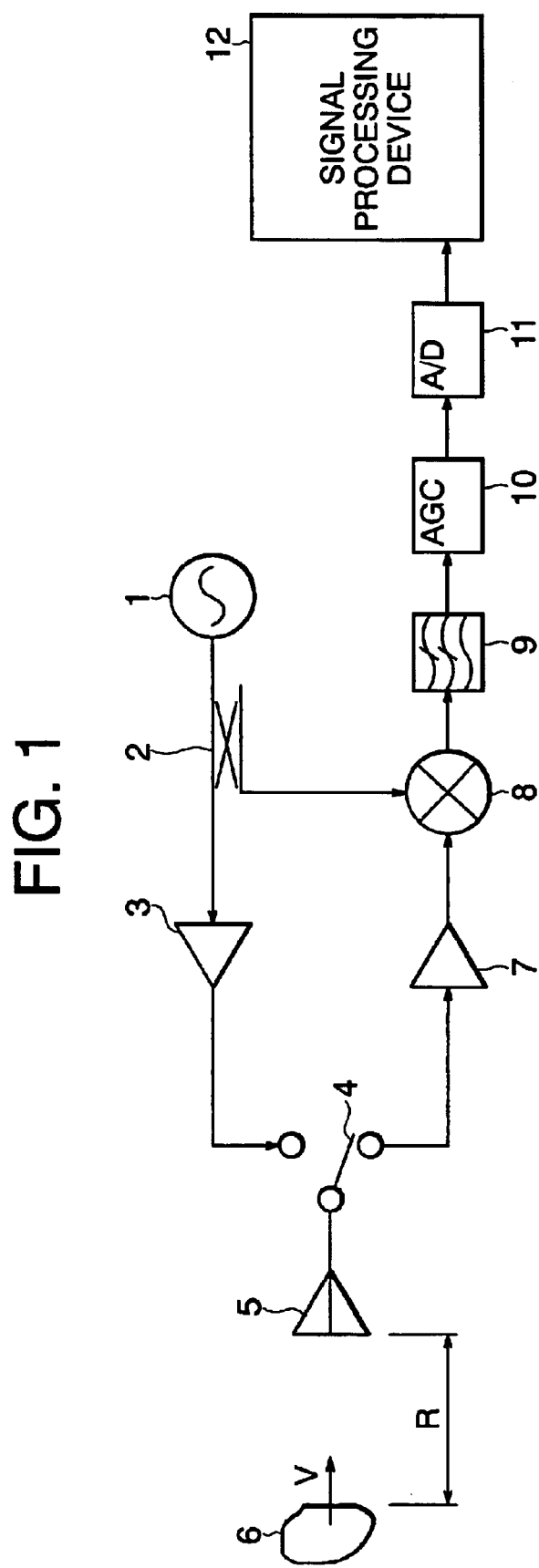
FIG. 1 is a diagram showing a structure of an in-vehicle pulse radar device in accordance with a first embodiment of the present invention.

An in-vehicle pulse radar device in accordance with a first embodiment of the present invention will be described with reference to the drawings. FIG. 1 is a diagram showing a structure of an in-vehicle pulse radar device (pulse Doppler radar) in accordance with the first embodiment of the present invention. In the respective drawings, the same reference numerals denote identical or equivalent parts.

Referring to FIG. 1, an oscillator (oscillating means) 1 generates the electromagnetic wave of, for example, a transmission frequency ftx=76.5 GHz. A power divider 2 that is connected to the oscillator 1 distributes a power of an electromagnetic wave from the oscillator 1 and supplies the power to both of a transmission amplifier 3 and a mixer 8. The transmission amplifier 3 amplifies the electromagnetic wave distributed by the power divider 2 for transmission. A switch 4 is a transmission/reception changeover switch that connects a transmission/reception common antenna 5 to the transmission amplifier 3 at the time of transmission, and connects the transmission/reception common antenna 5 to a reception antenna 7 at the time of reception. The transmitting means is made up of the transmission amplifier 3, the transmission/reception changeover switch 4 and the transmission/reception common antenna 5.

Also, in the figure, the reception antenna 7 amplifies the electromagnetic wave obtained by reflecting and returning the transmission electromagnetic wave by a target substance 6 that is apart from the radar by a distance R and moves at a relative speed V. The mixer 8 which is connected to the reception amplifier 7 mixes the electromagnetic wave which is distributed by the power divider 2 for LO (local oscillation) and the reflection wave of the target substance 6 together, and outputs a beat signal in accordance with the relative speed V of the target substance 6. A filter 9 has a cutoff frequency, which is substantially an inverse number of a pulse time width. An AGC amplifier 10 can adjust a gain in accordance with the reception power of the reflection wave. An A/D converter 11 converts the beat signal to a digital signal. A signal processing device (signal processing means) 12 calculates a distance to the target substance 6 and the relative speed thereof in accordance with an AD value.

The receiving means is made up of the transmission/reception common antenna 5, the transmission/reception changeover switch 4, the reception antenna 7, the mixer 8, the filter 9, the AGC amplifier 10 and the AD converter 11.

Subsequently, the operation of the in-vehicle pulse radar device in accordance with the first embodiment will be described with reference to the drawings.

First, the transmitting operation of the electromagnetic wave will be described.

An electromagnetic wave having, for example, a transmission frequency ftx=76.5 GHz is outputted from the oscillator 1. The electromagnetic wave passes through the power divider 2 and is then amplified by the transmission amplifier 3. Since the transmission/reception changeover switch 4 connects the transmission amplifier 3 and the transmission/reception common antenna 5 to each other, the electromagnetic wave which is amplified by the transmission amplifier 3 passes through the transmission/reception changeover switch 4 and is then outputted from the antenna 5 toward a space.

Then, the receiving operation of the electromagnetic wave will be described.

Figure 2:
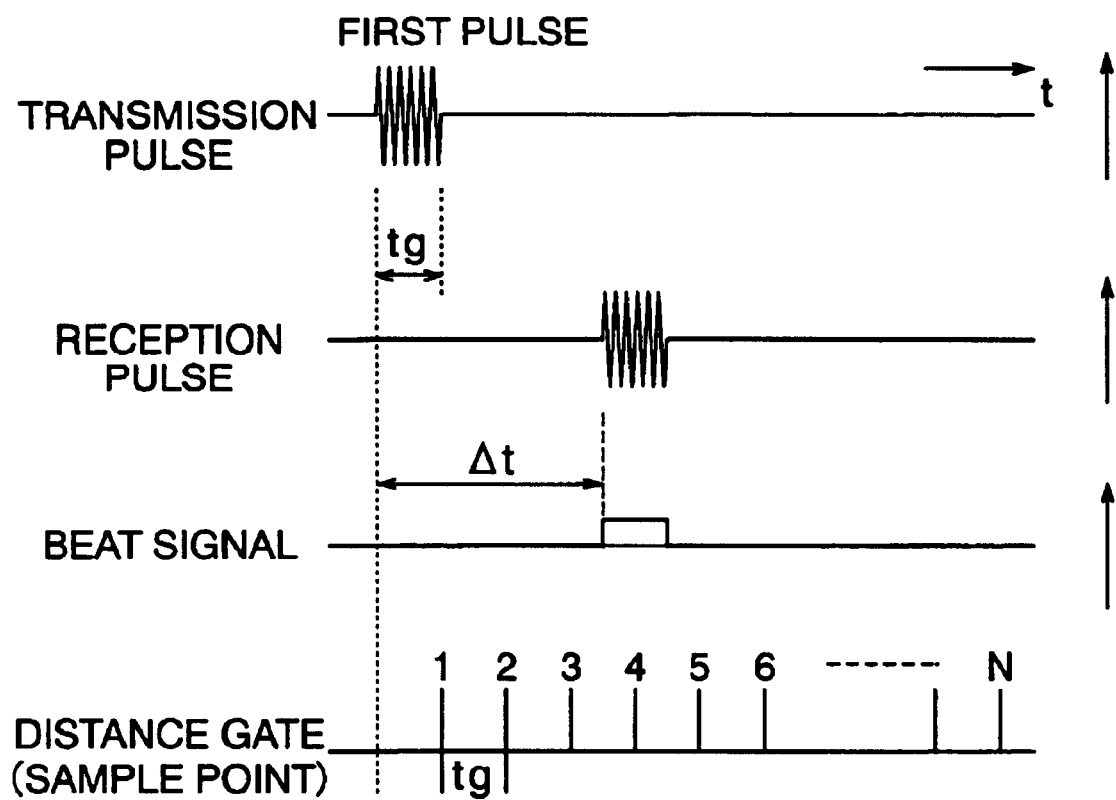
FIG. 2 is a timing chart showing transmission/reception of a pulse signal in the in-vehicle pulse radar device in accordance with the first embodiment of the present invention.
Figure 3B:
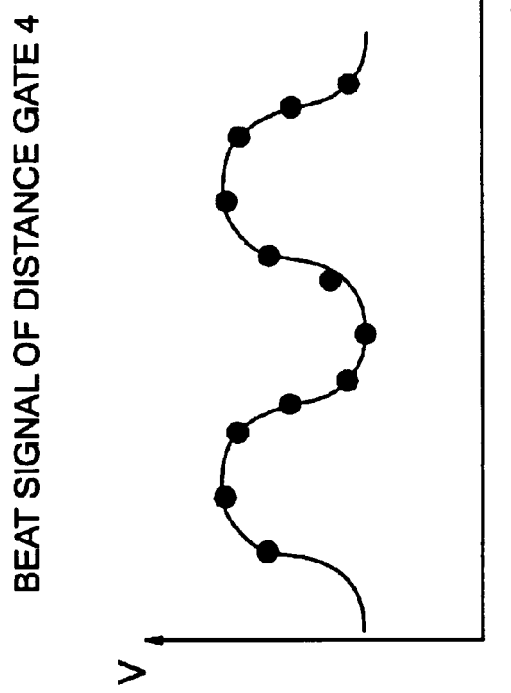
FIGS. 3A and 3B are graphs showing a beat signal of the in-vehicle pulse radar device in accordance with the first embodiment of the present invention.
Figure 3A:
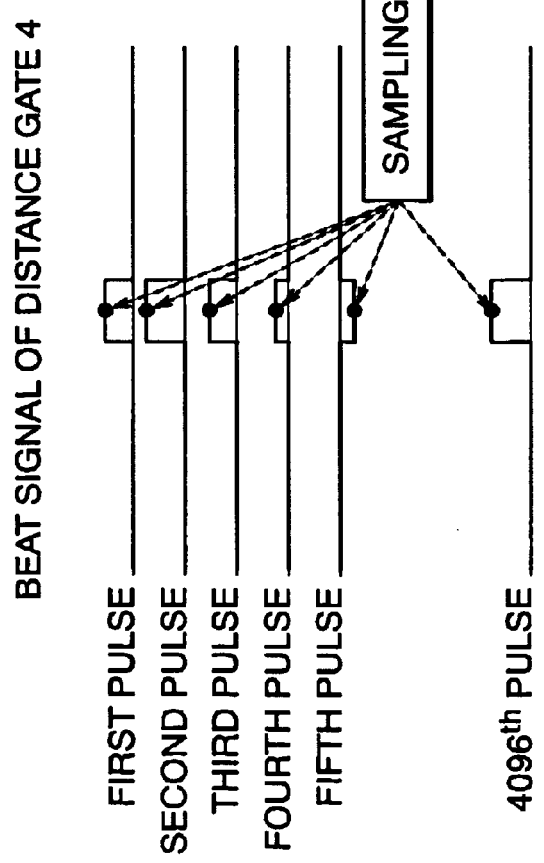
Figure 4:
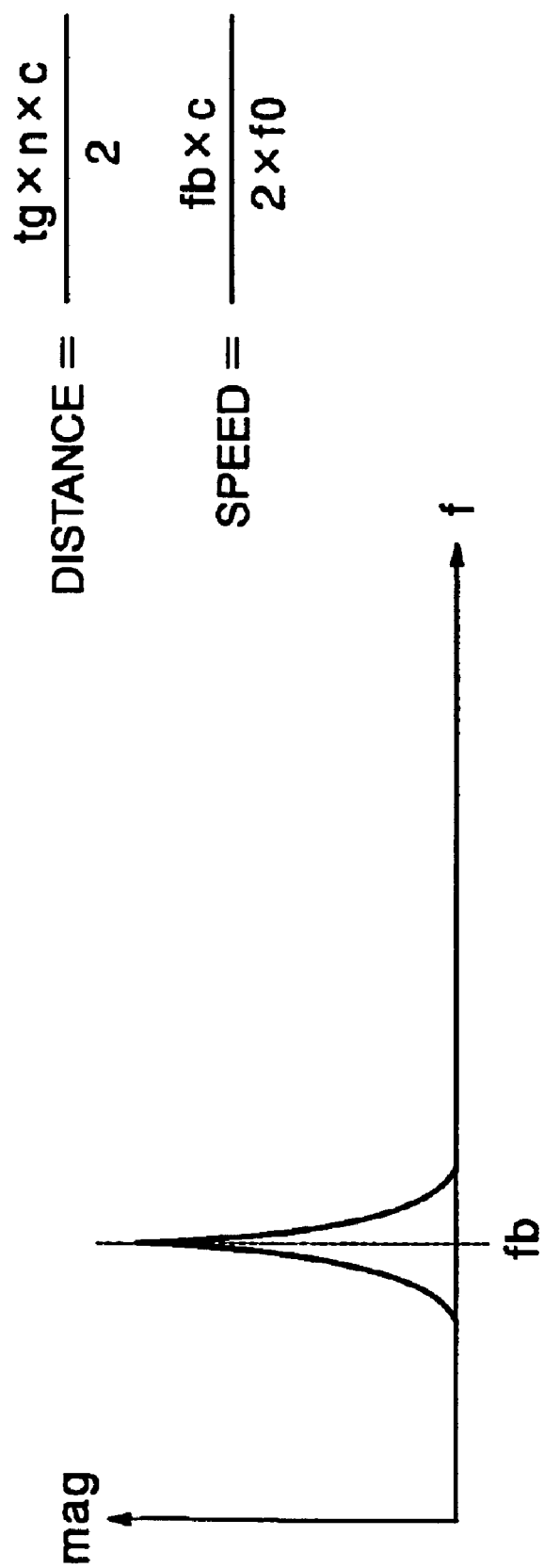
FIG. 4 is a graph showing a beat frequency of the in-vehicle pulse radar device in accordance with the first embodiment of the present invention.

FIG. 2 is a timing chart showing the transmission/reception of a pulse signal of the in-vehicle pulse radar device in accordance with the first embodiment of the present invention. Also, FIGS. 3A and 3B are graphs showing the beat signal of the in-vehicle pulse radar device in accordance with the first embodiment. Also, FIG. 4 is a graph showing the beat frequency of the in-vehicle pulse radar device in accordance with the first embodiment. In addition, FIG. 5 shows a pre-summing process of the in-vehicle pulse radar device in accordance with the first embodiment.

At a time point where a pulse time width Tg, for example, 33.3 ns (=1/30 MHz, corresponding to a distance of 5 m) elapses from an electromagnetic wave transmission start, or at the time where the pulse time width Tg is enlarged as much as a margin, the transmission/reception changeover switch 4 changes over to the reception side so as to connect the antenna 5 and the reception amplifier 7.

Also, the electromagnetic wave which is outputted from the antenna 5 to the space is reflected from the target substance 6 of the relative speed V which is apart by the distance R, and is then inputted to the antenna 5 with a delay time Δt that depends on the distance R with respect to the transmission electromagnetic wave as shown in FIG. 2.

Also, when the target substance 6 has the relative speed V, the reception electromagnetic wave frequency is Doppler-shifted by fb with respect to the transmission electromagnetic wave frequency ftx, and is then inputted to the antenna 5.

The electromagnetic wave which is inputted at the antenna 5 is amplified by the reception antenna 7 and then mixed with an LO electromagnetic wave from the power divider 2 by the mixer 8 to output the beat signal corresponding to the Doppler shift fb shown in FIG. 2. The obtained beat signal passes through the filter 9 of 30 MHz whose cutoff frequency is an inverse number of the pulse time width and is then amplified by the AGC 10 and inputted to the AD converter 11.

Now, a method in which the signal processing device 12 calculates the distance to the target substance 6 and the relative speed thereof in accordance with the data inputted to the AD converter 11 will be described below.

For example, when a speed resolution of 1 km/h (Δv) is intended to be obtained, the resolution Δf of the Doppler frequency is represented by the following expression (1) from the transmission frequency ftx=76.5 GHz. The wavelength of the transmission frequency ftx is designated by λ.

$$\Delta f = 2\Delta v / \lambda \quad (1)$$
$$= 2 \times 0.2777 \text{ [m/s]} / 0.003921 \text{ [m]}$$
$$= 141.64 \text{ [Hz]}$$
$$= 1/7.05977 \text{ [ms]}$$

As is apparent from the expression (1), a measurement period of time of 7.06 ms is required.

For example, in the case where the maximum detection distance of the radar is 150 m and the maximum measurement distance is set to about 260 m taking the margin of the distance by which a previous pulse is not received into consideration, a pulse cycle period becomes 33.3 ns×52=1.7 μs. Therefore, in order to obtain the speed resolution of 1 km/h, when the beat signals of 4096 pulses are obtained for each of the distance gates, and all of the data is subjected to the FFT process for each of the distance gates in the above-mentioned device as shown in FIGS. 3A and 3B, the Doppler shift fb is outputted by a certain distance gate as shown in FIG. 4.

The distance and the relative speed can be calculated by the following expressions (2) and (3).

$$\text{Distance} = tg \times n \times C/2 \quad (2)$$

$$\text{Relative speed} = fb \times C/2 \times f0 \quad (3)$$

where tg is a distance gate time width (pulse time width), n (=1 to N) is distance gate No., C is a luminous flux, fb is a beat frequency, and f0 is a transmission frequency (76.5 GHz).

However, in the above example, data of 4096 pulses is subjected to the FFT process for each of the distance gates, which makes the load on the signal processing device 12 large, and a super high performance DSP (digital signal processor) must be employed with the result that the costs increase. Also, when a normal DSP is used, the calculation period of time of FFT becomes long, and this is far from realization.

In order to solve the above-mentioned problem, data is added every given number of pulses, and the added data is subjected to the FFT process. FIG. 5 shows how sample data of the beat signals of 4096 pulses at a given distance gate n (=1 to N) undergoes the addition every 8 data (pre-sum), and the 512 points of pre-summed data are prepared to conduct the FFT.

Also, it is possible that, for example, the addition is performed every 16 data, and 256 points of data are subjected to the FFT process.

As a result, the amount of calculation of 90% or more can be suppressed. That is, assuming that the amount of calculation in the case where pre-summing process is not conducted is 100%, the amount of calculation is only 10% or less in the case where the pre-summing process is conducted. Even if the pre-summing process is performed, the number of times of pulse integration is not changed, so that S/N of the radar is maintained.

According to the first embodiment, the pre-summing process is performed prior to the FFT process, so that the amount of FFT calculation is reduced without lowering the radar detection performance. Accordingly, the in-vehicle radar high in performance and low in costs can be realized. Further, as compared with another radar, for example, a radar used for detecting a flying substance, a distance to be measured is short as well as a measurement range of the relative speed is made narrow, and thus if the number of samples subjected to the FFT process is reduced, the above radar can be easily realized without causing any problem.

(Second Embodiment)

Figure 7:
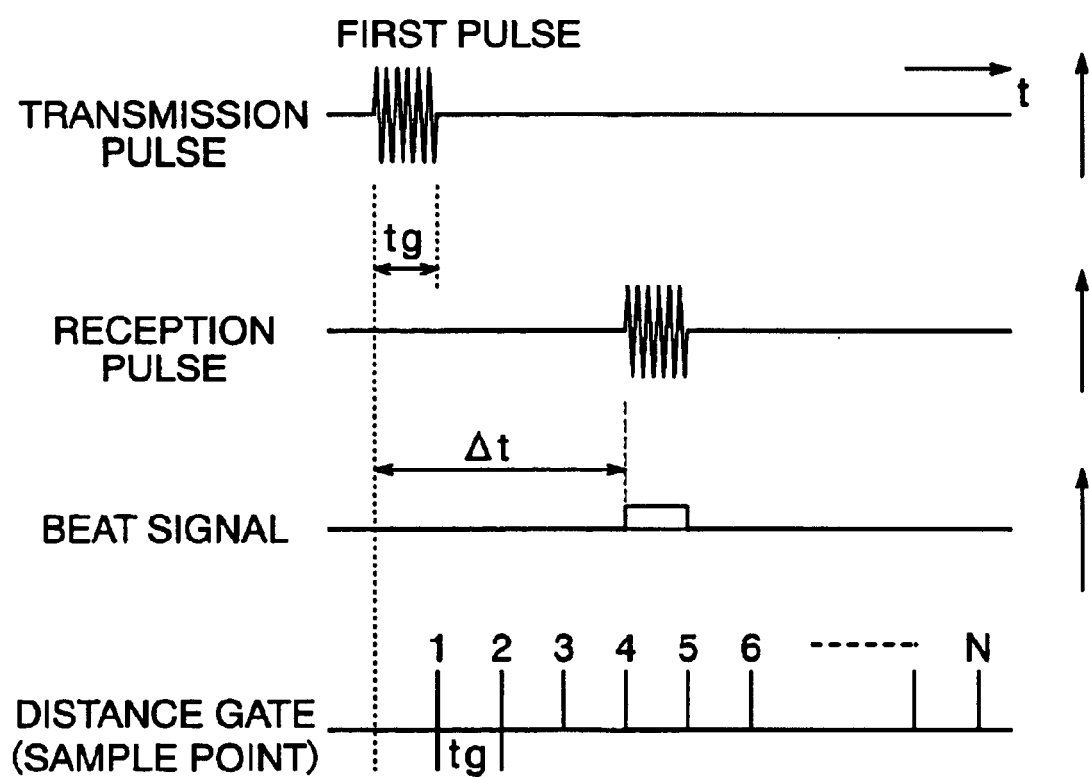
FIG. 7 is a timing chart showing transmission/reception of the pulse signal of the in-vehicle pulse radar device in accordance with the second embodiment of the present invention.

An in-vehicle pulse radar device in accordance with a second embodiment of the present invention will be described with reference to the drawings. FIG. 6 shows the pre-summing process of an in-vehicle pulse radar device in accordance with the second embodiment of the present invention. In addition, FIG. 7 is timing chart showing transmission/reception of a pulse signal of the in-vehicle pulse radar device in accordance with the second embodiment of the present invention.

In FIG. 6, regarding the sample data of beat signals corresponding to 4096 pulses, the data of the two distance gates, that is, the n-th distance gate and the (n+1)-th distance gate are collectively added every 8 pulses and the added data is subjected to the FFT process.

Also, it is possible that, the addition is performed every 16 data, and 256 points of data are subjected to the FFT process.

As a result, since the number of points of data subjected to the FFT process is the same as in the first embodiment, as compared with the case of performing no pre-summing process, the amount of calculation of 90% or more can be suppressed. That is, assuming that the amount of calculation in the case where pre-summing process is not conducted is 100%, the amount of calculation is only 10% or less in the case where the pre-summing process is conducted.

Also, in the case where the pulse width of the beat signal is substantially the same as the distance gate and disposed between the distance gates, because the pulse form of the beat signal is deformed by an influence of the filter 9, the energy of the reception beat signal is distributed into the distance gate 4 and the distance gate 5 with the result that the signal levels are lowered at the respective distance gates.

That is, there is a case in which S/N may change depending on which position of the distance gate the beat signal is received at. However, according to the second embodiment, the signal level and S/N hardly change since the signals from a plurality of distance gates are added irrespectively of the position at which the beat signal is received. For that reason, in the case where the angle measuring process is conducted by using the amplitude level in each of scanning directions, there is an advantage in that the angle measuring precision is improved.

In addition, in the case where the pulse width is made wider than the distance gate by providing the pulse width with a margin so as not to make the pulse width of the beat signal disposed between the distance gates, since signals across the respective distance gates can be synthesized and integrated, an advantage is obtained in that the S/N is improved.

In this example, the data of the two adjacent distance gates is pre-summed while sliding the distance gates one by one, but the data of a plurality of distance gates may be pre-summed while being slid one by one.

(Third Embodiment)

An in-vehicle pulse radar device in accordance with a third embodiment of the present invention will be described with reference to the drawings. FIG. 8 shows the pre-summing process of an in-vehicle pulse radar device in accordance with the third embodiment of the present invention.

In FIG. 8, regarding the sample data of beat signals corresponding to 4096 pulses, the data of the two distance gates, that is, the n-th distance gate and the (n+1)-th distance gate are collectively added every 8 pulses and the added data is subjected to the FFT process. Note that, N takes the odd number like 1, 3, 5, . . . .

As a result, since the number of points of data subjected to the FFT process is the same as in the first embodiment, as compared with the case of performing no pre-summing process, the amount of calculation of 90% or more can be suppressed. That is, assuming that the amount of calculation in the case where pre-summing process is not conducted is 100%, the amount of calculation is only 10% or less in the case where the pre-summing process is conducted.

Also, as shown in FIG. 7, in the case where the pulse width of the beat signal is substantially the same as the distance gate and disposed between the distance gates, the S/N hardly changes similar to the second embodiment. In addition, in the case where the pulse width is made wider than the distance gate by providing the pulse width with a margin, since signals across the respective distance gates can be synthesized and integrated, an advantage is obtained in that the S/N is improved.

In addition, the load of the pre-summing process can be reduced to the half as compared with that in the above-mentioned second embodiment.

As a result, there can be achieved signal processing which is well-balanced in the pre-summing process load, the S/N improvement, and the stabilization of S/N.

In this example, the data of the two adjacent distance gates is pre-summed while sliding the distance gates on the basis of two gates, but the data of a plurality of distance gates maybe pre-summed while being slid on the basis of plural gates.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An in-vehicle pulse radar device, comprising:

oscillation means for generating an electromagnetic wave;

transmitting means for transmitting the electromagnetic wave generated by the oscillation means toward a target substance;

receiving means for receiving the reception electromagnetic wave reflected by the target substance to output data; and signal processing means for pre-summing the data which is sampled for each distance gates based on the data from the receiving means, and subjecting the pre-summed data which is a result of the pre-summing process to FFT process to obtain a distance between a subject vehicle and the target substance and a relative speed therebetween in accordance with a spectrum frequency and amplitude information which are a result of the FFT process.

2. An in-vehicle pulse radar device according to claim 1, wherein the signal processing means implements the pro-summing process over a plurality of distance gates.

3. An in-vehicle pulse radar device according to claim 2, wherein the signal processing means implements the pro-summing process over the plurality of distance gates while sliding the distance gates one by one.

4. An in-vehicle pulse radar device according to claim 2, wherein the signal processing means implements the pre-summing process over the plurality of distance gates while sliding the distance gates on the basis of the two or more distance gates.

* * * * *